Patented Sept. 13, 1938

2,129,667

UNITED STATES PATENT OFFICE 2,129,667

ESTERS OF METHACRYLIC ACID

Harold J. Barrett and Daniel E. Strain, Wilmington, Del., assignors to E. I. du Pont de Nemours & Company, Wilmington, Del., a corporation of Delaware No Drawing. Application July 14, 1934, Serial No. 735,279

15 Claims. (Cl. 260—2)

The present invention relates to new compositions of matter, to methods for their preparation, and more particularly to the methacrylic acid esters of the aralkyl alcohols.

An object of the present invention is to provide new compositions of matter and a process for their preparation. A further object of the invention is to provide a new polymerizable composition of matter together with a process for its polymerization. A still further object of the invention is to provide a process for the preparation of the methacrylic acid esters of the aralkyl alcohols, which may be obtained by the ester interchange method of interacting a lower alkyl ester of methacrylic acid with the alcohol in the presence of a suitable catalyst or by the reaction of the alcohol with a methacrylyl halide. Another object of the invention is to provide mixtures or interpolymers of the polymerized resin with other polymerizable compounds of methacrylic and acrylic acids. Other objects and advantages of the invention will hereinafter appear.

There have been prepared in accord with this invention valuable esters of methacrylic acid which have been found useful as prepared and even more valuable when polymerized. These compounds may be generally described as methacrylic acid esters of furfuryl alcohol and of the primary aralkyl alcohols such, for example, as betaphenylethyl alcohol, benzyl alcohol, the phenyl alkyl alcohols as, for example, phenyl methyl, ethyl, propyl, butyl, and higher primary alkyl alcohols with one or more aryl groups substituted for hydrogens on the hydrocarbon chain; the ortho cresyl alkyl alcohols as, for example, ortho cresyl methyl, ethyl, propyl, etc. alcohols; phenyl methyl carbinol, triphenyl carbinol; naphthyl alkyl or furfuryl alkyl alcohols, or in fact any aralkyl alcohol having the structural formula R—(CH$_2$OH)$_x$, in which R is a substituted or unsubstituted aryl or aralkyl group and $x$ one or more.

The following specific examples are furnished to illustrate methods of preparing the new compositions of matter but it will be understood that the invention is not limited to the details therein given.

*Example 1.*—244 parts of beta phenyl ethanol, 800 parts of methyl methacrylate, 450 parts of benzene, 48 parts of hydroquinone, and 5 parts of sulfuric acid (concentrated) were mixed and warmed on a water bath until solution was complete. The solution was then heated to a temperature of 130–136° C. on an oil bath under a 48″ fractionating column fitted with a condenser arranged for controlled reflux. The distillate, which consisted of a benzene-methanol binary was collected at such a rate that the temperature at the head of the column remained at 58–59° C. Heating was continued until the temperature at the head of the column could not be maintained at 58–59° C. The progress of the reaction was followed by measuring the amount of methanol in the distillate as shown by the portion that would dissolve in water. The cold reaction mixture was neutralized and then washed and dried over a suitable desiccating medium. The solvents were removed from the dried product by fractional distillation, and the ester finally separated by fractionation under reduced pressure. An 80% yield of betaphenylethyl methacrylate was obtained, which had a boiling point of 110–117° C. at 5 mm., a density of 1.018 at 20° C. and a saponification number of 292 (theoretical 296).

*Example 2.*—155 parts of furfuryl alcohol, 600 parts of methyl methacrylate, 700 parts of dry benzene, and 30 parts (all parts are by weight) of phenylene diamine were mixed and heated to boiling on an oil bath under a 48″ column. After the solution had started to boil the addition of approximately 40 parts of the catalyst comprising a 20% sodium methylate solution in methanol was started and it was added in small portions at short intervals while the reaction was being carried out at a temperature of approximately 130–135° C. The catalyst solution was added from a dropping funnel thru a side neck in the reaction flask. The course of the reaction was followed by measuring the amount of methanol (water soluble portion) in the distillate. The addition of catalyst was generally stopped a short time before the theoretical amount of methanol was obtained. The cold reaction mixture was neutralized and then washed and dried over a suitable desiccating medium, 20 parts of hydroquinone were added and the solvents removed from the dried product by fractional distillation; the ester finally separated by fractionation under reduced pressure. A 50% yield of furfuryl methacrylate was obtained. The ester had a boiling point of 80–82° C. at 5 mm., a density of 1.055 at 20° C., and a saponification number of 336 (theoretical 338).

Other methods may, of course, be employed for the preparation of the enumerated methacrylates such, for example, as are disclosed in the copending applications of Barrett and Strain S. N. 735,274 and 735,277, filed July 14, 1934 or by any of the well known esterification or ester interchange processes.

The methacrylates, as prepared in accord with the examples, are usually mobile liquids, but may sometimes be solids. The esters as thus produced are monomeric and may be polymerized, according to the invention, by means of heat, light, and/or a catalyst, e. g., as described for the polymerization of organic vinyl esters in British specification 15271/1914. Preferably a catalyst, such as oxygen, ozone, an organic peroxide, an ozonide, etc. is employed. Other catalysts which may be used include aluminum sulfate, boron fluoride, the mineral acids, e. g., hydrochloric and sulfuric acids as well as the organic acids, for example, acetic, methacrylic acids, etc., as well as the anhydrides and acid halides of such organic acids; metal salts of fatty acids and resinic acids, e. g., cobalt linoleate and resinate, manganese oleate, rosin, etc. The polymerization may be effected in the presence or absence of a solvent for both monomer and polymer, or in the presence of a solvent for the monomer and a non-solvent for the polymer, or the monomer may be emulsified and then polymerized. Preferably polymerization is carried out at a moderate temperature, i. e., between 60–100° C., altho higher temperatures, such as, for example, 130° C. or higher, may be employed. The polymerization reaction is usually strongly exothermic and it may be necessary to control the temperature by cooling devices, though polymerization may be carried out in apparatus which may or may not be provided with condensing devices, or in suitable pressure equipment.

As indicated, various methods may be employed for polymerizing the monomeric esters of methacrylic acid and it has been found that the properties of the resins, the physical properties to a large extent and the chemical properties to a lesser extent, are altered considerably by the type of polymerizing process utilized. The process described in the copending applications of D. E. Strain, Ser. Nos. 668,080 filed April 26, 1933 and 704,753 filed Dec. 30, 1933, may be used if desired.

Methods illustrating the polymerization of the esters will now be described, but it will be understood that other suitable polymerizing processes may be employed.

*Example 3.*—99 parts (parts are given by weight) of beta phenyl ethyl methacrylate monomer was dissolved in 310 parts of methanol in a bottle provided with a stopper, then 1 part of powdered benzoyl peroxide added to this solution. After the benzoyl peroxide was all dissolved, 60 parts of water insufficient to cause permanent turbidity was added. The bottle was securely closed and set in an oven at approximately 65° C. After the polymerization was complete in approximately 3 days, the mixture was allowed to cool. The liquid was decanted, the resin, a fused, semi-transparent, hard, and brittle mass, was removed from the bottle and was cut into small pieces and dried in a vacuum desiccator. A 91% yield of the polymer was obtained which was relatively insoluble in common organic solvents. The resin was placed in a disk shaped mold in which it was subjected to a temperature of 60° C. and a pressure of approximately 4000 pounds per square inch for approximately 15 minutes. A rather brittle molded disk was obtained which softened at a temperature of 40° C.

*Example 4.*—50 parts (parts are given by weight) of furfuryl methacrylate monomer was dissolved in 235 parts of methanol in a bottle provided with a stopper, then 0.5 part of powdered benzoyl peroxide added to this solution. The bottle was securely closed and set in an oven at approximately 65° C. After the polymerization was complete in approximately 2 days, the mixture was allowed to cool. The product was filtered, washed with a little cold methanol and dried in a vacuum desiccator. The polymer was obtained in a 62% yield as a slightly yellow, sandy-like powder, which is relatively insoluble in common organic solvents. The resin was placed in a disk shaped mold in which it was subjected to a temperature of 180° C. and a pressure of approximately 4000 pounds per square inch for approximately 15 minutes. A very hard, brittle, dark brown, molded disk was obtained which softened at a temperature of 78° C.

*Example 5.*—20 parts (parts are given by weight) of benzyl methacrylate monomer, prepared in accord with the process of Example 1, was dissolved in 150 parts of methanol in a bottle provided with a stopper, then 0.2 part of powdered benzoyl peroxide added to this solution. After the benzoyl peroxide was all dissolved, 30 parts of water insufficient to cause permanent turbidity was added. The bottle was securely closed and set in an oven at approximately 65° C. After the polymerization was complete, in approximately 2 days, the mixture was allowed to cool. The liquid was decanted, the resin removed from the bottle, cut into small pieces, and dried in a vacuum desiccator. The polymer was obtained in a 90% yield as a semi-fused, brittle material, which was soluble in toluene and gave a cloudy solution in acetone. It was relatively insoluble in butyl acetate and gasoline. The viscosity of a 5% solution in toluene at 25° C. was 0.135 poise. The resin was placed in a disk shaped mold in which it was subjected to a temperature of 110° C. and a pressure of approximately 5000 pounds per square inch for approximately 15 minutes. A water clear, brittle molded disk was obtained which softened at a temperature of 45° C.

Valuable products may be obtained by utilizing the polymers of the esters described herein together with equivalents or homologues thereof admixed with other polymeric acrylic or methacrylic esters or other derivatives. Especially valuable products result if the monomeric esters are mixed and then polymerized; by this method interpolymers having a wide range of characteristics are made. Due to the unique characteristics of methyl methacrylate polymer which is a hard resin having a high melting point, its admixture with the polymeric esters of methacrylic acids herein described or interpolymers thereof are particularly well adapted for many uses.

The polymerized esters of methacrylic acid as well as mixtures or interpolymers thereof with other polymerizable compounds are particularly well suited for thermoplastic molding. The monomer may be polymerized and/or preformed prior to placing in the mold and then may be molded in accord with the usual procedural steps employed particularly in the molding of methyl methacrylate as described in the Rowland Hill U. S. Patent No. 1,980,483. The mold preferably is hot, prior to the introduction of the polymerization product, is then closed and the material so confined heated and pressed, the temperatures ranging from approximately 80–150° C., and pressures from 200 pounds per square inch upward are usually sufficient to give a suitably molded product. The presence or absence of plasticizers will, of course, alter considerably the molding conditions and it is usually advantageous to have present plasticizers to alter the physical characteristics of the resulting product to fit the particular need for which the molded article is to be used.

The masses resulting from polymerization can immediately (i. e., in the state they have been obtained) be made into useful articles. It is possible to obtain the required articles if, for instance, the polymerization be carried out while the initial material is in a suitable mold, for instance one of steel or glass, so that the articles, for example, umbrella handles, fountain pen barrels, buttons, and the like, are obtained directly from the mold. Or, if desired, the masses may be worked to the required shape by softening with suitable softeners or plasticizers in the presence of volatile solvents and, after shaping, evaporating the solvent.

The polymerization products may be worked into the required shapes in various ways; for example, they can be softened and kneaded, rolled, compressed, drawn into wires, threads or the like, or the masses can be mixed with additional substance, and rolled into plates, or films, or they may be pressed into the required shapes such as buttons, combs, and the like.

The solid masses can be worked by cutting, sawing, filing, or the like, whether they be obtained directly by polymerization or after special treatment of the polymerized masses. These shaped articles may be polished, and parts connected together by smearing the faces to be connected with a suitable solvent, such as acetone, epichlorhydrin, or the corresponding methacrylic acid ester.

The polymerization product dissolved in a suitable solvent which may or may not be the monomer may be transformed into a useful article, e. g., films, by casting and then evaporating the solvent, or by extruding thru a suitable orifice into a precipitating bath or drying atmosphere. The polymer may be recovered from such solutions by precipitation with a suitable non-solvent for the polymer.

The properties of the resulting masses may be widely varied by modification with plasticizers, e. g., dibutyl phthalate, tricresyl phosphate, etc., drying, semi-drying, and non-drying oils, synthetic and natural resins, waxes, bitumens, cellulose derivatives, e. g., cellulose nitrate and ethyl cellulose, etc., pigments, fillers, dyes, etc. Thus it is possible to produce instead of hard, glass-like masses also soft and flexible masses. Likewise, by the addition of suitable coloring means, it is possible to produce masses or objects having any desired color effects. The incorporation of the additions can be effected either before or during the polymerizing process, or the additions can be made to the already formed polymerization products in a suitable condition.

If the polymerization of an organic methacrylic acid ester be carried out in an incomplete manner, a syrupy solution of the polymerization product containing some unchanged methacrylic acid ester is obtained. This product can be utilized either directly or along with other solvents or diluents for the production of substances to be used for coating, painting or impregnating purposes. If, for instance, a porous substance, such as wood, paper, textile fabric, artificial stone, or the like be coated with the said syrupy solution or be impregnated therewith, very resistant coating and impregnations are obtained on completing the polymerization of the coating, painting, or impregnation, for instance by exposing the article to artificial or natural light or by heating it, or by employing both light and heat. In this case a portion of the unchanged methacrylic acid ester in the syrupy solution may or may not be evaporated while another portion may be converted into the solid polymerization product. The articles thus treated have imparted to them a very high resistance to external influences, e. g. resistance to water, acids, alkalis, and atmospheric changes.

The said syrupy mass can be mixed with comminuted matter, such, for instance, as ground cork, or ground wood, fibrous substances, mineral fillers, or the like, and the mixture be made into the proper shape and the unchanged methacrylic acid esters in the articles be converted, by suitable polymerization, into the solid final product.

It is also possible to start from solid, semi-solid, or plastic polymerization products of the methacrylic acid esters, these being softened by heating them by themselves, or with suitable solvents, and using them in their softened state. On cooling or on the evaporation of the diluent that may still be present the product is converted into the solid lacquer-form.

It is obvious that mixtures of various polymerized methacrylic acid esters can be used for lacquering, painting, or impregnating in accordance with this invention. It is likewise obvious that the wholly or partly polymerized esters can be mixed with suitable additional substances to modify the properties of the lacquering, painting, or impregnating materials in any desired manner. As additions of this kind oils should be mentioned (such, for instance, as castor oil), dyes, powdered substances (such as zinc oxide), camphor, camphor substitutes, and the like.

In accordance with this invention it is possible to obtain valuable products if the said polymers be dissolved, or softened, in suitable solvents and then be converted again to the solid state. The products thus obtained may be used for purposes for which cellulose esters have hitherto been used, namely, as substitutes for horn, amber, artificial resins, lacquers for impregnation purposes, and also for the production of films, interlayer for safety glass, pressure, adhesives, artificial threads, and the like.

The products thus formed have the advantage over products made from nitrocellulose in being less inflammable. By the addition of suitable agents, the strength and hardness of the products may be modified within wide limits so that it is possible to manufacture both hard, horn-like substances, and soft and more pliable products. The products may also be modified by varying the conditions of the polymerization.

The monomer may be polymerized in the presence of a solvent and the solution used as such or the polymer recovered from the solution by evaporation or precipitation methods. In many cases, however, it is more profitable to use an amount of solvent insufficient to produce a freely flowing solution, so that soft plastic masses are obtained which can be pressed, kneaded, rolled or drawn into shape, or formed into blocks, plates, or films.

Plasticizers or other modifying agents may be added to the monomer prior to polymerization or directly to the polymerized product, it being generally desirable to employ a plasticizer which is soluble in the polymer and the monomer, altho it is not essential that the dual solubility characteristics be present. Thus, plasticizers or softening agents, such as, for example, camphor; phthalates, such as ethyl, propyl, isopropyl, butyl, isobutyl, cyclohexyl, methyl cyclohexyl, or benzyl phthalate or phthalates of the mixed type such as cyclohexyl butyl, benzyl butyl or butyl lauryl phthalate; esters of other dibasic acids, such as the ethyl, propyl, isopropyl, butyl, isobutyl, cyclohexyl, methyl cyclohexyl or benzyl esters of succinic, fumaric, tartaric, adipic and sebacic acids; esters of monobasic acids, such as the butyl, isobutyl, cyclohexyl, methyl cyclohexyl, benzyl or lauryl esters of lauric, laevulinic, benzoic, benzoyl propionic and benzoyl benzoic acids; esters of polyhydric alcohols, e. g. glycol and glycerol, such as glycol benzoate, glycol laevulinate, triacetin, tripropionin and tributyrin; substituted toluene sulphonamides, such as ethyl paratoluene sulphonamide; substituted amides, such as tetraethyl phthalamide, tetrabutyl succinamide, tetrabutyl adipamide, tetraethyl phthalamide; hydrocarbons, such as dixylyl ethane; halogenated hydrocarbons, such as chlorinated diphenyls and dichlordibenzyl; ether compounds such as dicresoxy ethyl ether; and drying, non-drying, or semi-drying oils, such as castor oil, cotton seed oil, linseed oil, and the like. These additions also facilitate later mechanical treatment, as cutting, sawing, and polishing.

The polymerized esters, mixtures of the polymerized esters with dissimilar polymerizable esters or other polymerizable compounds of methacrylic or acrylic acids; or vinyl compounds, or interpolymers of the esters with such other compounds, may be used advantageously as safety glass interlayers. These polymerized esters, mixtures thereof, or interpolymers thereof may be plasticized or otherwise modified as desired. The compositions may be compounded with glass in an unpolymerized, partially polymerized, or completely polymerized condition. When compounding the safety glass with the unpolymerized or partially polymerized compositions, the polymerization may be effected by subjecting the sandwich of glass and compound to suitable application of light and/or heat.

From a consideration of the above specification it will be realized that various changes may be made in the process or product without departing from the invention or sacrificing any of its advantages.

We claim:
1. Betaphenylethyl methacrylate.
2. Benzyl methacrylate.
3. A new composition of matter comprising betaphenylethyl methacrylate having a boiling point of 110–117° C. at a pressure of 5 mm.
4. Polymeric betaphenylethyl methacrylate.
5. Polymeric benzyl methacrylate.
6. A molding composition comprising a polymeric methacrylic acid ester of an aralkyl alcohol.
7. A molding composition comprising a polymeric methacrylic acid ester of an aralkyl alcohol and a plasticizer therefor.
8. A molding composition comprising a polymeric betaphenylethyl methacrylate and a plasticizer therefor.
9. A molding composition comprising a polymeric benzyl methacrylate and a plasticizer therefor.
10. A process for the polymerization of a methacrylic acid ester of an aralkyl alcohol which comprises heating the methacrylate monomer dissolved in methanol containing benzoyl peroxide and water to a temperature of approximately 65° C., and holding it at that temperature until polymerization is substantially complete.
11. A molded article containing a methacrylic acid ester of an aralkyl alcohol.
12. A methacrylic acid ester of a monocylic aromatic primary alcohol.
13. As a new article of manufacture a methacrylic acid ester of an aralkyl alcohol.
14. The polymeric methacrylic acid ester of an aralkyl alcohol.
15. An interpolymer of a methacrylic acid ester of an aralkyl alcohol and a polymerizable compound selected from the group consisting of acrylic acid and methacrylic acid derivatives.

HAROLD J. BARRETT.
DANIEL E. STRAIN.